United States Patent
Vu et al.

(10) Patent No.: US 11,290,515 B2
(45) Date of Patent: Mar. 29, 2022

(54) REAL-TIME AND LOW LATENCY PACKETIZATION PROTOCOL FOR LIVE COMPRESSED VIDEO DATA

(71) Applicant: Advanced Micro Devices, Inc., Sunnyvale, CA (US)

(72) Inventors: Ngoc Vinh Vu, Cupertino, CA (US); Darren Rae Di Cera, Reservoir (AU); Adam William Lynch, Melbourne (AU); Shane Bentley, Kinglake West (AU); Douglas Mammoser, Austin, TX (US); David Robert Stark, Jr., New Braunfels, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 429 days.

(21) Appl. No.: 15/834,400

(22) Filed: Dec. 7, 2017

(65) Prior Publication Data
US 2019/0182308 A1    Jun. 13, 2019

(51) Int. Cl.
*H04L 29/06* (2006.01)
*H04L 65/80* (2022.01)
(Continued)

(52) U.S. Cl.
CPC ............ *H04L 65/80* (2013.01); *H04L 1/0003* (2013.01); *H04L 1/0009* (2013.01);
(Continued)

(58) Field of Classification Search
CPC . H04L 1/0003; H04L 1/0009; H04L 27/0008; H04L 65/607; H04L 65/608; H04L 65/80; H04L 69/04
See application file for complete search history.

(56) References Cited

U.S. PATENT DOCUMENTS

| 5,930,390 A | 7/1999 | Coelho |
| 6,524,198 B2 | 2/2003 | Takeda |
| (Continued) | | |

FOREIGN PATENT DOCUMENTS

| JP | 2016505291 A | 2/2016 |
| JP | 2017517921 A | 6/2017 |
| WO | 2014078452 A1 | 5/2014 |

OTHER PUBLICATIONS

International Search Report and Written Opinion in International Application No. PCT/IB2018/057511, dated Jan. 22, 2019, 8 pages.
(Continued)

*Primary Examiner* — Thomas R Cairns
(74) *Attorney, Agent, or Firm* — Kowert Hood Munyon Rankin and Goetzel PC; Rory D. Rankin (57) ABSTRACT

Systems, apparatuses, and methods for implementing real-time, low-latency packetization protocols for live compressed video data are disclosed. A wireless transmitter includes at least a codec and a media access control (MAC) layer unit. In order for the codec to communicate with the MAC layer unit, the codec encodes the compression ratio in a header embedded inside the encoded video stream. The MAC layer unit extracts the compression ratio from the header and determines a modulation coding scheme (MCS) for transferring the video stream based on the compression ratio. The MAC layer unit and the codec also implement a feedback loop such that the MAC layer unit can command the codec to adjust the compression ratio. Since the changes to the video might not be implemented immediately, the MAC layer unit relies on the header to determine when the video data is coming in with the requested compression ratio.

20 Claims, 7 Drawing Sheets

(51) Int. Cl.
  *H04L 27/00* (2006.01)
  *H04L 65/65* (2022.01)
  *H04L 1/00* (2006.01)
  *H04L 69/04* (2022.01)
  *H04L 65/60* (2022.01)

(52) U.S. Cl.
  CPC ........ *H04L 27/0008* (2013.01); *H04L 65/607* (2013.01); *H04L 65/608* (2013.01); *H04L 69/04* (2013.01)

(56) References Cited

U.S. PATENT DOCUMENTS

| | | | |
|---|---|---|---|
| 6,618,397 B1 * | 9/2003 | Huang | .................... H04L 29/06 370/392 |
| 6,680,976 B1 | 1/2004 | Chen et al. | |
| 6,683,988 B1 | 1/2004 | Fukunaga et al. | |
| 6,754,234 B1 | 6/2004 | Wiesner et al. | |
| 7,471,823 B2 | 12/2008 | Ubillos et al. | |
| 7,813,000 B2 | 10/2010 | Temasky et al. | |
| 8,175,181 B1 * | 5/2012 | Nabar | .................. H04L 1/0003 370/437 |
| 9,270,969 B2 | 2/2016 | Hong et al. | |
| 9,407,923 B2 | 8/2016 | Barak | |
| 9,924,134 B2 | 3/2018 | Glen | |
| 2001/0033286 A1 | 10/2001 | Stokes et al. | |
| 2005/0223165 A1 | 10/2005 | Schmidt et al. | |
| 2006/0171596 A1 | 8/2006 | Sung et al. | |
| 2008/0049651 A1 | 2/2008 | Chang et al. | |
| 2009/0052537 A1 | 2/2009 | Burazerovic et al. | |
| 2009/0148058 A1 | 6/2009 | Dane et al. | |
| 2009/0213940 A1 | 8/2009 | Steinbach et al. | |
| 2010/0050225 A1 | 2/2010 | Bennett | |
| 2010/0157154 A1 | 6/2010 | Kobayashi et al. | |
| 2010/0177776 A1 | 7/2010 | Crinon et al. | |
| 2011/0050695 A1 | 3/2011 | Sullivan et al. | |
| 2011/0066262 A1 | 3/2011 | Kelly et al. | |
| 2011/0157196 A1 | 6/2011 | Nave et al. | |
| 2011/0263332 A1 | 10/2011 | Mizrachi | |
| 2011/0299606 A1 | 12/2011 | Chen et al. | |
| 2012/0008679 A1 | 1/2012 | Bakke | |
| 2012/0079329 A1 | 3/2012 | Steinbach et al. | |
| 2012/0236934 A1 | 9/2012 | Chen et al. | |
| 2012/0243009 A1 | 9/2012 | Chapman et al. | |
| 2013/0039594 A1 | 2/2013 | Chen et al. | |
| 2013/0053141 A1 | 2/2013 | Guérin et al. | |
| 2013/0058394 A1 | 3/2013 | Nilsson et al. | |
| 2013/0076771 A1 | 3/2013 | Bachman et al. | |
| 2013/0083161 A1 | 4/2013 | Hsu et al. | |
| 2013/0335432 A1 | 12/2013 | Iwasaki | |
| 2014/0028876 A1 | 1/2014 | Mills | |
| 2014/0194196 A1 | 7/2014 | Hoy et al. | |
| 2014/0211860 A1 | 7/2014 | Zhao et al. | |
| 2014/0267780 A1 | 9/2014 | Spears et al. | |
| 2014/0317068 A1 * | 10/2014 | Yang | ...................... H03M 7/30 707/693 |
| 2014/0372918 A1 | 12/2014 | Wang | |
| 2014/0376612 A1 | 12/2014 | Chen et al. | |
| 2015/0296215 A1 | 10/2015 | Callahan | |
| 2016/0358305 A1 | 12/2016 | Banerjee et al. | |
| 2016/0381392 A1 | 12/2016 | Wiegand et al. | |
| 2017/0142447 A1 | 5/2017 | Toth et al. | |
| 2018/0091819 A1 * | 3/2018 | Cook | .................... H04N 19/30 |
| 2019/0068983 A1 | 2/2019 | Ryan et al. | |
| 2019/0104311 A1 | 4/2019 | Amer et al. | |
| 2019/0158704 A1 | 5/2019 | Sines et al. | |

OTHER PUBLICATIONS

Cheng et al., U.S. Appl. No. 16/263,709, entitled "Multiple Application Cooperative Frame-Based GPU Scheduling", filed Jan. 31, 2019, 33 pages.

Non-Final Office Action in U.S. Appl. No. 16/263,709, dated Mar. 18, 2020, 9 pages.

Non-Final Office Action in U.S. Appl. No. 15/686,892, dated Jun. 1, 2020, 14 pages.

Non-Final Office Action in U.S. Appl. No. 15/816,765, dated Jun. 26, 2019, 11 pages.

Office Action in Korean Patent Application No. 10-2020-7016094, dated Nov. 3, 2021, 10 pages.

Non-Final Office Action in Japanese Patent Application No. 2020-526583, dated Jan. 25, 2022, 11 pages.

\* cited by examiner

REAL-TIME AND LOW LATENCY PACKETIZATION PROTOCOL FOR LIVE COMPRESSED VIDEO DATA

BACKGROUND

Description of the Related Art

A wireless communication link can be used to send a video stream from a computer (or other device) to a virtual reality (VR) headset (or head mounted display (HMD)). Transmitting the VR video stream wirelessly eliminates the need for a cable connection between the computer and the user wearing the HMD, thus allowing for unrestricted movement by the user. A traditional cable connection between a computer and HMD typically includes one or more data cables and one or more power cables. Allowing the user to move around without a cable tether and without having to be cognizant of avoiding the cable creates a more immersive VR system. Sending the VR video stream wirelessly also allows the VR system to be utilized in a wider range of applications than previously possible.

However, a VR application is a low latency application which does not typically buffer video data. For example, when the user moves their head, this is detected by the HMD or console, and then the subsequently rendered video frames are updated to reflect the new viewing position of the user. Additionally, changing conditions of the link can affect video quality. When the link deteriorates and video data is lost or corrupted, this can result in a poor user experience. Accordingly, improved techniques for wireless streaming of data are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing real-time and low latency packetization protocols for live compressed video data are disclosed herein. In one embodiment, a wireless communication system includes a transmitter and a receiver communicating over a wireless link. In one embodiment, the transmitter is configured to encode a video stream and wirelessly transmit the encoded video stream to the receiver. In one embodiment, the video stream is part of a virtual reality (VR) rendered environment.

In order for the codec to communicate with the media access control (MAC) layer unit, the codec encodes information in headers embedded inside the encoded video stream. For example, to allow the media access control (MAC) layer unit to know the compression ratio of the video, the codec stores an indication of the compression ratio in the header of a chunk of compressed video data. The MAC layer unit extracts the compression ratio and other information (e.g., QoS, wireless frame packaging) from the header. If the compression ratio is greater than a programmable threshold, then the MAC uses a relatively low modulation coding scheme (MCS) level to transfer the video stream on the wireless link. The MAC layer unit and the codec also implement a feedback loop such that the MAC layer unit can tell the codec to adjust the compression settings used to compress the video to match the available bandwidth on the wireless link.

For example, the MAC layer unit can request that the codec increase the compression ratio in order to decrease the bandwidth utilization on the wireless link. When the MAC layer unit requests for the codec to perform a specific action, there is typically some latency before the action is taken. Accordingly, the changes to the compressed video data might not be implemented right away, and the MAC layer unit relies on the information in the header to determine when the video data is coming in with the requested bandwidth. In one embodiment, in a chunk of compressed video data, if the chunk is 1000 bytes, the first 64 bytes of the 1000 bytes stores the header. In other embodiments, the size of the header can vary. In one embodiment, a delimiter is used to indicate the boundary of the header. Other information in the header includes the ID of the current compressed video block, the fovation map (i.e., where the eye is focused), color coding, subsampling, etc. At the receiver, if the receiver does not receive a block of data with a particular block ID, then the receiver can utilize various recovery techniques to recover the missing block of data.

Figure 1:
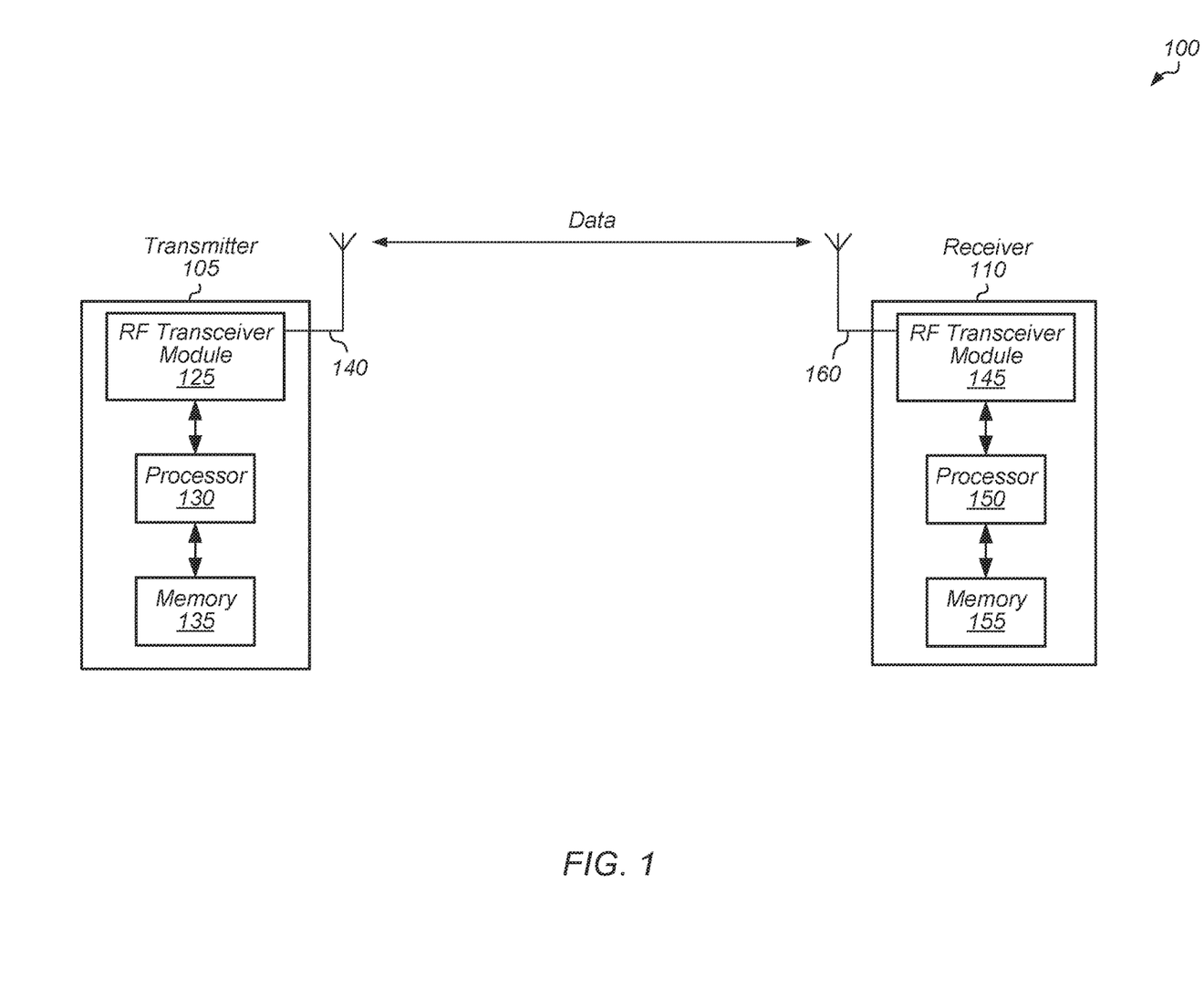
FIG. 1 is a block diagram of one embodiment of a system.

Referring now to FIG. 1, a block diagram of one embodiment of a system 100 is shown. System 100 includes at least a first communications device (e.g., transmitter 105) and a second communications device (e.g., receiver 110) operable to communicate with each other wirelessly. It is noted that receiver 110 can also transmit data and/or acknowledgments to transmitter 105. Accordingly, transmitter 105 and receiver 110 can also be referred to as transceivers. In one embodiment, transmitter 105 and receiver 110 communicate wirelessly over the unlicensed 60 Gigahertz (GHz) frequency band. For example, transmitter 105 and receiver 110 can communicate in accordance with the Institute of Electrical and Electronics Engineers (IEEE) 802.11ad standard (i.e., WiGig). In other embodiments, transmitter 105 and receiver 110 can communicate wirelessly over other frequency bands and/or by complying with other wireless communication standards.

Wireless communication devices that operate within extremely high frequency (EHF) bands, such as the 60 GHz frequency band, are able to transmit and receive signals using relatively small antennas. However, such signals are subject to high atmospheric attenuation when compared to transmissions over lower frequency bands. In order to reduce the impact of such attenuation and boost communication range, EHF devices typically incorporate beamforming technology. For example, the IEEE 802.11ad specification details a beamforming training procedure, also referred to as sector-level sweep (SLS), during which a wireless station tests and negotiates the best transmit and/or receive antenna combinations with a remote station. In various embodiments, transmitter 105 and receiver 110 are configured to perform periodic beamforming training procedures to determine the optimal transmit and/or receive antenna combinations for wireless data transmission.

Transmitter 105 and receiver 110 are representative of any type of communication devices and/or computing devices. For example, in various embodiments, transmitter 105 and/or receiver 110 can be a mobile phone, tablet, computer, server, television, game console, head-mounted display (HMD), another type of display, router, or other types of computing or communication devices. In various embodiments, system 100 is configured to execute latency sensitive applications. For example, in one embodiment, system 100 executes a virtual reality (VR) application for wirelessly transmitting frames of a rendered virtual environment from transmitter 105 to receiver 110. In other embodiments, other types of latency sensitive applications can be implemented by system 100 that take advantage of the methods and mechanisms described herein.

In one embodiment, transmitter 105 includes at least radio frequency (RF) transceiver module 125, processor 130, memory 135, and antenna 140. RF transceiver module 125 is configured to transmit and receive RF signals. In one embodiment, RF transceiver module 125 is a mm-wave transceiver module operable to wirelessly transmit and receive signals over one or more channels in the 60 GHz band. RF transceiver module 125 converts baseband signals into RF signals for wireless transmission, and RF transceiver module 125 converts RF signals into baseband signals for the extraction of data by transmitter 105. It is noted that RF transceiver module 125 is shown as a single unit for illustrative purposes. It should be understood that RF transceiver module 125 can be implemented with any number of different units (e.g., chips) depending on the embodiment. Similarly, processor 130 and memory 135 are representative of any number and type of processors and memory devices, respectively, that can be implemented as part of transmitter 105.

Transmitter 105 also includes antenna 140 for transmitting and receiving RF signals. Antenna 140 represents one or more antennas, such as a phased array, a single element antenna, a set of switched beam antennas, etc., that can be configured to change the directionality of the transmission and reception of radio signals. As an example, antenna 140 includes one or more antenna arrays, where the amplitude or phase for each antenna within an antenna array can be configured independently of other antennas within the array. Although antenna 140 is shown as being external to transmitter 105, it should be understood that antenna 140 can be included internally within transmitter 105 in various embodiments. Additionally, it should be understood that transmitter 105 can also include any number of other components which are not shown to avoid obscuring the figure. Similar to transmitter 105, the components implemented within receiver 110 include at least RF transceiver module 145, processor 150, memory 155, and antenna 160, which are similar to the components described above for transmitter 105. It should be understood that receiver 110 can also include or be coupled to other components (e.g., a display).

The link between transmitter 105 and receiver 110 has capacity characteristics that fluctuate with variations in the environment. In various embodiments, transmitter 105 is configured to reduce the amount of data that is sent over the link by compressing the video data prior to transmission. In one embodiment, transmitter 105 adjusts the compression settings that are utilized for compressing the video data based on the fluctuating capacity characteristics of the wireless link. In one embodiment, transmitter 105 includes at least a codec for compressing the video data and a media access control (MAC) layer unit for modulating the compressed video data in preparation for transmitting the compressed video data wirelessly. It is noted that a "codec" can also be referred to as an "encoder" herein.

The codec is configured to compress video data and then send compressed video data to the MAC layer unit. The codec is configured to receive frames of a video stream and compress the frames. The codec can send a chunk of the compressed frame at a time to the MAC layer unit. In one embodiment, after compressing a frame of the video stream or a portion of the frame, the codec is configured to calculate a compression ratio of the size of the uncompressed video data compared to the compressed video data. Alternatively, the codec can calculate the compression rate, which can be expressed as a percentage, with the percentage indicating the size of the compressed video data compared to the original, uncompressed video data.

Next, after calculating the amount of compression that was achieved (e.g., compression ratio, compression rate), the codec embeds an indication of the amount of compression in a header that is included with each chunk of compressed video data. The codec can also store additional information (e.g., fovation map, color coding information, subsampling information) in the header. Then, the codec sends each chunk of compressed video data to the MAC layer unit. When the MAC layer unit receives a chunk of compressed video data from the codec, the MAC layer unit extracts the header from chunk of compressed video data. The MAC layer unit retrieves the indication of the compression ratio, and then the MAC layer unit utilizes the compression ratio when determining which modulation coding scheme (MCS) level to utilize for modulating the compressed video data for transmission over the wireless link.

In one embodiment, the MAC layer unit provides feedback to the codec to instruct the codec to change how the video data is compressed. When the codec performs an action in response to feedback from the MAC layer, the codec embeds information in the header in the coded video stream to inform the MAC layer unit of the actions that the codec has taken (e.g., a change in the compression ratio). When the MAC layer unit sends a request to the codec, there is typically some latency before the codec performs an action in response to the request. For example, based on a change in the link condition, the MAC layer unit can command the codec to decrease the compression ratio, but the codec may wait a few frames before decreasing the compression ratio. Therefore, when the MAC layer unit receives a block of compressed data and the MAC layer unit expects a first compression ratio but instead receives video compressed at a second compression ratio, the MAC layer unit needs to be aware of this situation for the few frames before the compression ratio is changed as requested, and the codec uses the header to notify the MAC layer unit of the compression ratio (as well as other information).

Figure 2:
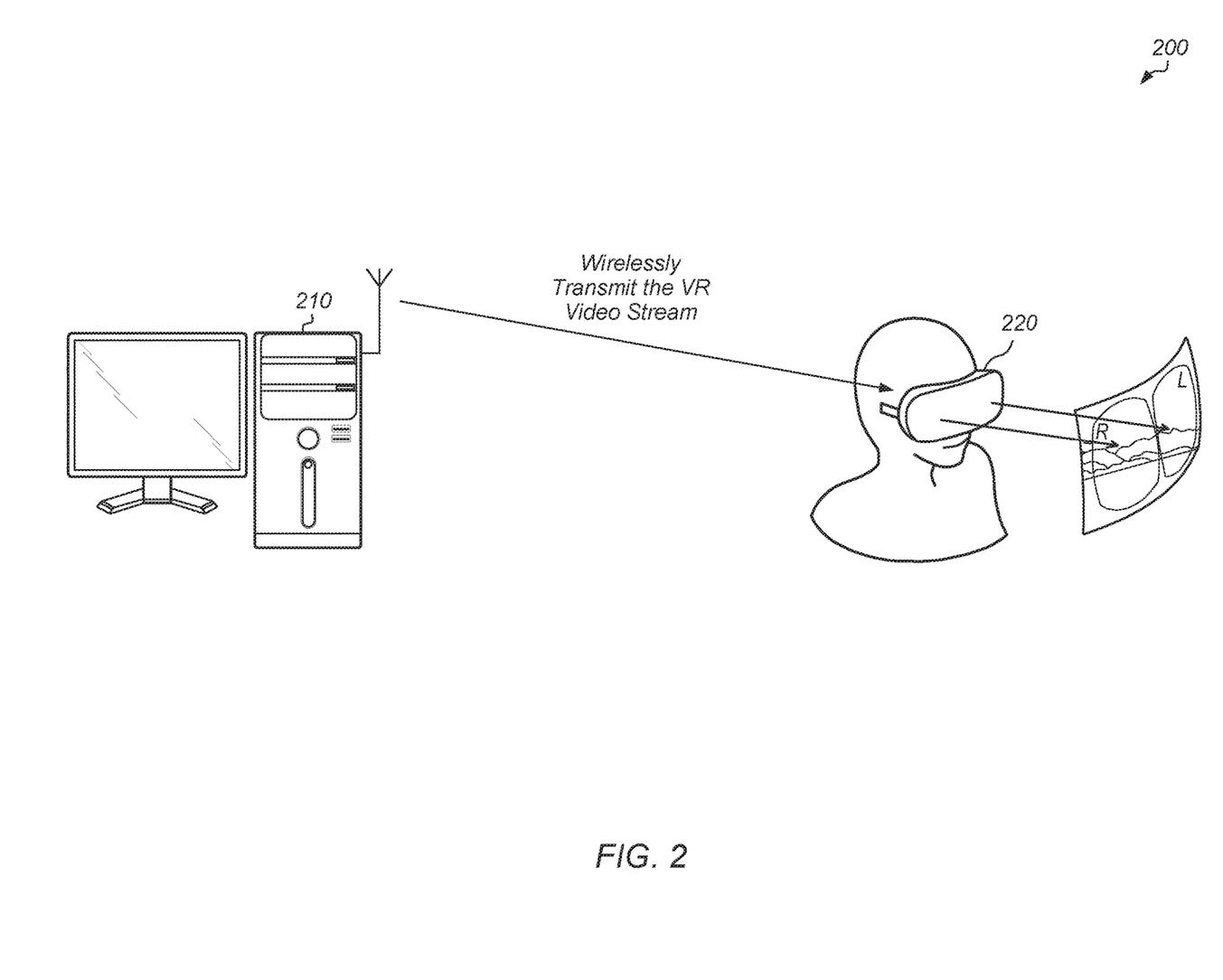
FIG. 2 is a block diagram of one embodiment of a wireless virtual reality (VR) system.

Turning now to FIG. 2, a block diagram of one embodiment of a wireless virtual reality (VR) system 200 is shown. System 200 includes at least computer 210 and head-mounted display (HMD) 220. Computer 210 is representative of any type of computing device which includes one or more processors, memory devices, input/output (I/O) devices, RF components, antennas, and other components indicative of a personal computer or other computing device. In other embodiments, other computing devices, besides a personal computer, can be utilized to send video data wirelessly to head-mounted display (HMD) 220. For example, computer 210 may be a gaming console, smart phone, set top box, television set, video streaming device, wearable device, a component of a theme park amusement ride, or otherwise.

Computer 210 and HMD 220 each include circuitry and/or components to communicate wirelessly. It should be understood that while computer 210 is shown as having an external antenna, this is shown merely to illustrate that the video data is being sent wirelessly. It should be understood that computer 210 can have an antenna which is internal to the external case of computer 210. Additionally, while computer 210 can be powered using a wired power connection, HMD 220 is typically battery powered. Alternatively, computer 210 can be a laptop computer powered by a battery.

In one embodiment, computer 210 includes circuitry configured to dynamically render a representation of a VR environment to be presented to a user wearing HMD 220. For example, in one embodiment, computer 210 includes one or more graphics processing units (GPUs) to render a VR environment. In other embodiments, computer 210 can include other types of processors, including a central processing unit (CPU), application specific integrated circuit (ASIC), field programmable gate array (FPGA), digital signal processor (DSP), or other processor types. HMD 220 includes circuitry to receive and decode a compressed bit stream sent by computer 210 to generate frames of the rendered VR environment. HMD 220 then drives the generated frames to the display integrated within HMD 220.

After rendering a frame of a virtual environment video stream, computer 210 encodes (i.e., compresses) the rendered frame and then sends the encoded frame wirelessly to HMD 220. In one embodiment, a MAC layer unit of computer 210 determines how much each rendered frame should be compressed based on the available bandwidth on the wireless link. Then, the MAC layer unit sends a request to the codec to compress each rendered frame to match the available bandwidth on the wireless link.

The codec compresses each rendered frame and then sends an indication of the compression ratio in a header with each chunk of compressed data. The MAC layer unit selects a MCS level for modulating and sending the compressed data over the wireless link to HMD 220. It is noted that a "MCS level" can also be referred to as a "MCS index".

For example, a low MCS level such as MCS level 0 using binary phase shift keying (BPSK) encodes a single bit per symbol and is a robust modulation since it takes a higher amount of noise or distortion to make the demodulator reach an incorrect decision as compared to a less reliable MCS. MCS level 0 offers protection against channel errors at the expense of a lower transmission rate. Other MCS levels utilize other types of modulation. For example, MCS level 2 uses quadrature phase shift keying (QPSK) modulation, MCS level 4 uses 16 quadrature amplitude modulation (QAM), and MCS level 7 uses 64-QAM. Generally speaking, as the MCS level increases, the bit rate increases while the resiliency of the signal decreases. In other words, higher resilience and lower data rates are achieved with relatively low MCS levels while lower resilience and higher data rates are achieved with relatively high MCS levels.

Figure 3:
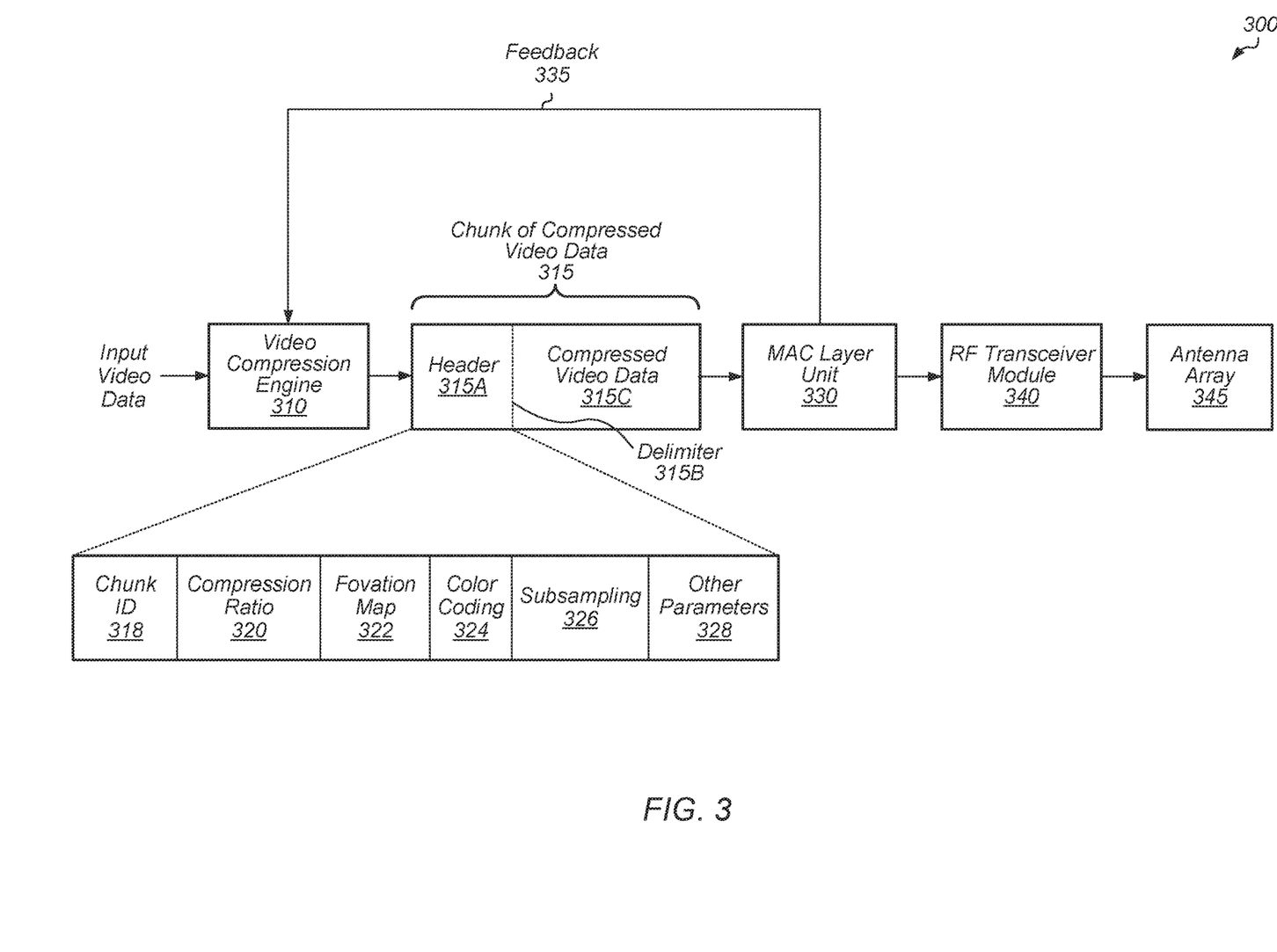
FIG. 3 is a block diagram of one embodiment of a transmitter.

Referring now to FIG. 3, a block diagram of one embodiment of logic of a transmitter 300 is shown. In one embodiment, the logic of transmitter 300 is included within transmitter 105 (of FIG. 1). In another embodiment, the logic of transmitter 300 is included within computer 210 (of FIG. 2). In one embodiment, transmitter 300 include video compression engine 310, media access control (MAC) layer unit 330, RF transceiver module 340, and antenna array 345. Video compression engine 310 can also be referred to as a codec or encoder. Video compression engine 310 and MAC layer unit 330 can be implemented with any suitable combination of hardware and/or software. Transmitter 300 can also include other logic that is not shown in FIG. 3 to avoid obscuring the figure.

Video compression engine 310 is configured to receive input video data and to generate a chunk of compressed video data 315 for each given portion of the input video data. In one embodiment, each chunk of compressed video data 315 corresponds to a single frame of the input video data. In another embodiment, each chunk of compressed video data 315 corresponds to a portion of a single frame of the input video data. Each chunk of compressed video data 315 includes a header 315A, delimiter 315B, and compressed video data 315C. Header 315A is expanded to show the components that are located in chunk 315 prior to delimiter 315B. Header 315A includes chunk (or block) identifier (ID) 318, compression ratio 320, fovation map 322, color coding settings 324, subsampling settings 326, and other parameters 328. In other embodiments, header 315A can include other parameters and/or header 315A can be formatted differently. In one embodiment, the compression ratio is defined as the ratio between the uncompressed size of a video frame and the compressed size of the video frame. For example, if video compression engine 310 compresses a video frame from a size of 10 megabytes (MB) to 2 MB, the compression ratio for this given video frame is 5. A compression ratio of 5 can also be expressed as 5:1 or 5/1.

MAC layer unit 330 is configured to extract the header 315A from each received chunk of compressed video data 315. MAC layer unit 330 is configured to utilize the compression ratio 320 when determining how to modulate the chunk of compressed video data 315. Then, MAC layer unit 330 provides the modulated data to RF transceiver module 340 and antenna array 345 to be sent wirelessly to the receiver (e.g., HMD 220 of FIG. 2).

For example, if the compression ratio is below a given threshold, then MAC layer unit 330 can select a first MCS level for modulating the compressed video data. Otherwise, if the compression ratio is above the given threshold, then MAC layer unit 330 can utilize a second MCS level for modulating the chunk of compressed video data 315, wherein the second MCS level less than the first MCS level. MAC layer unit 330 can compare the compression ratio to any number of thresholds and choose a MCS level for modulating the compressed video data 315C based on which two thresholds the compression ratio falls between.

In various embodiments, MAC layer unit 330 is configured to provide feedback 335 to video compression engine 310. For example, in one embodiment, MAC layer unit 330 sends a request to video compression engine 310 to change the compression ratio of the compressed video data 315B. In one embodiment, MAC layer unit 330 requests for video compression engine 310 to adjust the compression ratio based on detecting a change in the link condition. For example, if the link condition deteriorates, MAC layer unit 330 can request that video compression engine 310 increase the compression ratio so that there is less data to send on the link. When MAC layer unit 330 requests an adjustment in the compression ratio, video compression engine 310 can continue to compress several chunks of data before the change is actually implemented. Accordingly, MAC layer unit 330 extracts the header 315A and retrieves compression ratio 320 to determine the actual compression ratio 320 that was achieved for the compressed video data 315C. MAC layer unit 330 can then determine how to modulate the compressed video data 315B based on the actual compression ratio 320.

Figure 4:
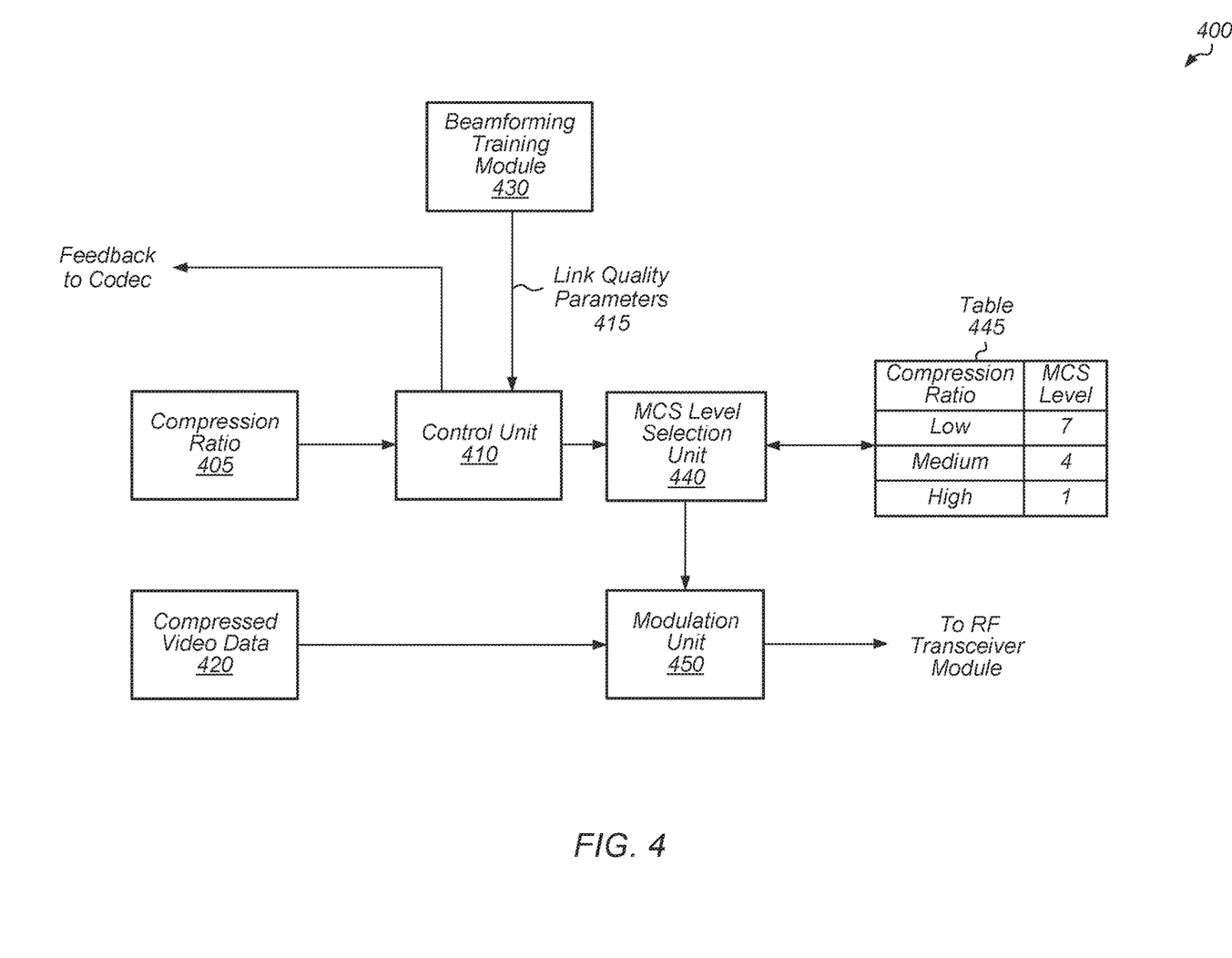
FIG. 4 is a block diagram of one embodiment of a MAC layer unit.

Turning now to FIG. 4, a block diagram of one embodiment of a MAC layer unit 400 is shown. In one embodiment, the logic of MAC layer unit 400 is included within MAC layer unit 330 (of FIG. 3). In one embodiment, MAC layer unit 400 includes control unit 410, MCS selection unit 440, and modulation unit 450. MAC layer unit 400 is configured to extract compression ratio 405 from a header (e.g., header 315A of FIG. 3) which is included within a given chunk of compressed video data. MCS level selection unit 440 is configured to utilize the compression ratio 405 to determine which MCS level to utilize when modulating the compressed video data 420 which is sent over a wireless link to the receiver (not shown). An indication of the selected MCS level is provided to modulation unit 450 for modulating the compressed video data 420 which will be sent over the wireless link.

For example, in one embodiment, MCS level selection unit 440 includes or is coupled to table 445. Table 445 includes entries that map a given compression ratio to a corresponding MCS level. For example, if the compression ratio is low (i.e., less than a first threshold), then a MCS level of 7 is utilized when modulating the compressed video data 420. Alternatively, if the compression ratio is medium (i.e., greater than the first threshold but less than a second threshold), then a MCS level of 4 is utilized. Still further, if the compression ratio is high (i.e., greater than the second threshold), then a MCS level of 1 is utilized. It should be understood that the mappings of compression ratio to MCS level shown in table 445 are merely indicative of one particular embodiment. In other embodiments, other mappings can be utilized. Also, in further embodiments, table 445 can have other numbers of entries to map compression ratios to different MCS levels. Additionally, in still further embodiments, MCS level selection unit 440 can utilize other techniques for mapping compression ratios to MCS levels.

In one embodiment, control unit 410 is configured to receive link quality parameters 415 which are generated by beamforming training module 430. In one embodiment, beamforming training module 430 is configured to monitor the quality of the wireless link during beamforming training and generate link quality parameters 415 based on the quality of the link. The link quality parameters 415 give control unit 410 a measure of the current link quality of the link. Based on the current link quality, control unit 410 is configured to provide feedback to the codec (e.g., video compression engine 310) to request that the codec adjust the compression ratio of the compressed video data. For example, if the current link quality is poor (i.e., less than a threshold), then control unit 410 can request that the codec increase the compression ratio.

Figure 5:
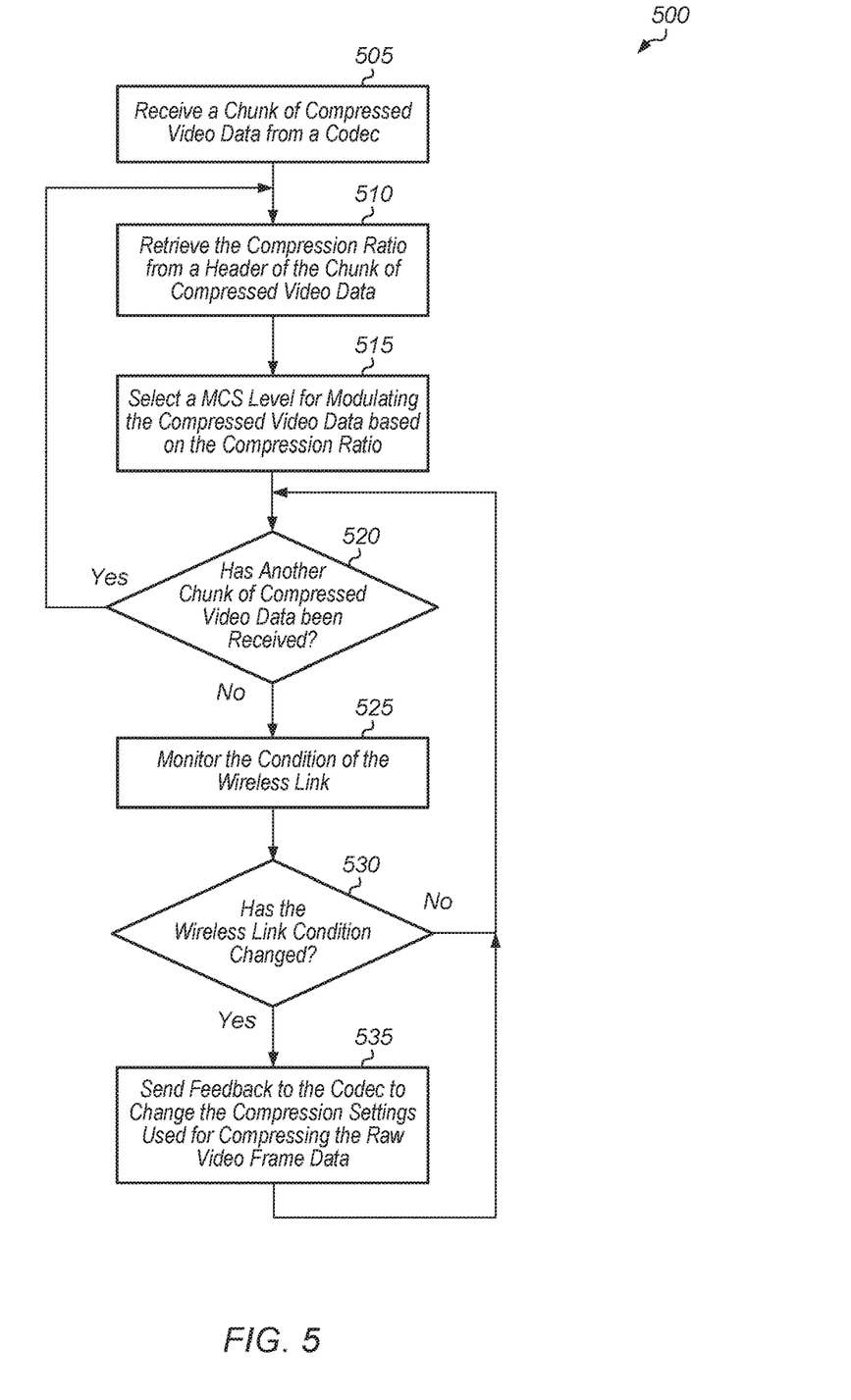
FIG. 5 is a generalized flow diagram illustrating one embodiment of a method for selecting a MCS level.
Figure 6:
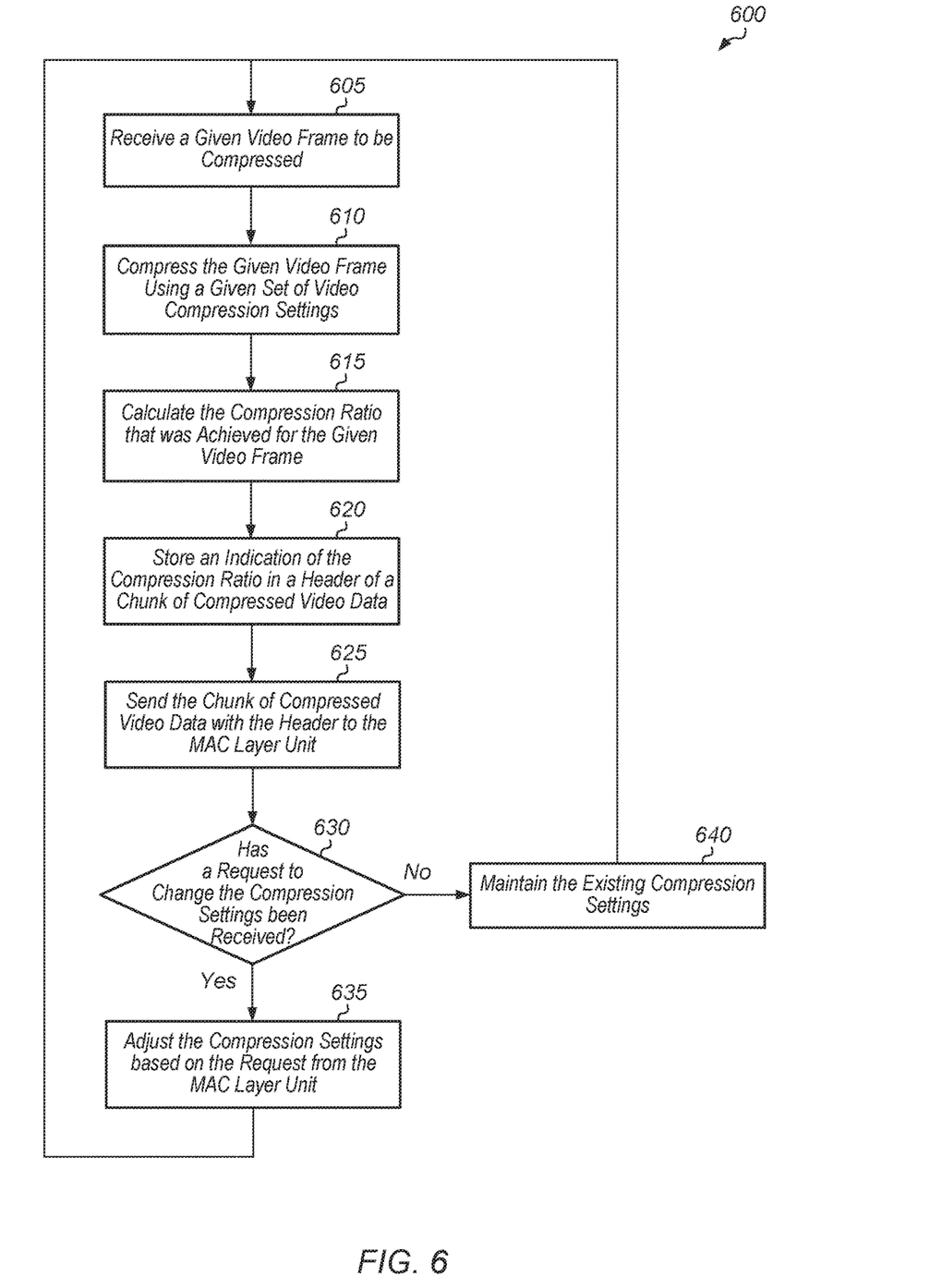
FIG. 6 is a generalized flow diagram illustrating one embodiment of a method for implementing a codec.
Figure 7:
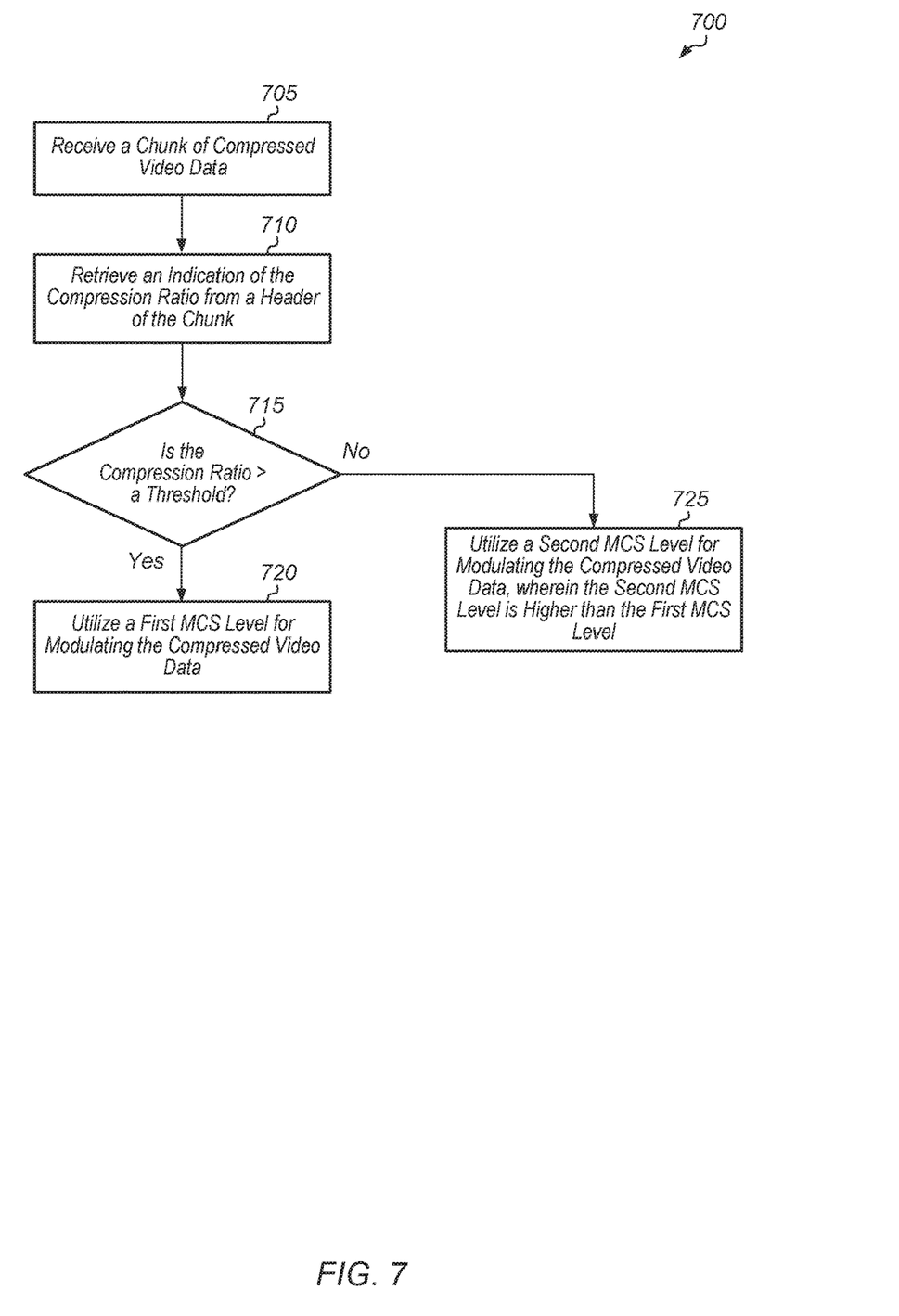
FIG. 7 is a generalized flow diagram illustrating one embodiment of a method for selecting a MCS level based on a compression ratio.

Referring now to FIG. 5, one embodiment of a method 500 for selecting a MCS level for modulating video data is shown. For purposes of discussion, the steps in this embodiment and those of FIG. 6-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A MAC layer receives a chunk of compressed video data from a codec (block 505). Next, the MAC layer retrieves the compression ratio from a header of the chunk of compressed video data (block 510). Then, the MAC layer selects a MCS level for modulating the compressed video data based on the compression ratio (block 515). If another chunk of compressed video data has been received (conditional block 520, "yes" leg), then method 500 returns to block 510. If the MAC layer has not received another chunk of compressed video data (conditional block 520, "no" leg), then the MAC layer monitors the condition of the wireless link (block 525).

If the wireless link condition has changed (conditional block 530, "yes" leg), then the MAC layer sends feedback to the codec to change the compression settings used for compressing the raw video frame data (block 535). After block 535, method 500 returns to conditional block 520. If the wireless link condition has not changed (conditional block 530, "no" leg), then method 500 returns to conditional block 520.

Turning now to FIG. 6, one embodiment of a method 600 for implementing a codec is shown. A codec receives a given video frame to be compressed (block 605). The codec compresses the given video frame using a given set of video compression settings (block 610). Next, the codec calculates the compression ratio that was achieved for the given video frame (block 615). Next, the codec stores an indication of the compression ratio in a header of a chunk of compressed video data (block 620). Then, the codec sends the chunk of compressed video data with the header to the MAC layer unit (block 625). If the codec receives a request from the MAC layer unit to change the video compression settings (conditional block 630, "yes" leg), then the codec adjusts the compression settings based on the request from the MAC layer unit (block 635). Otherwise, if the codec does not receive a request from the MAC layer unit to change the video compression settings (conditional block 630, "no" leg), then the codec maintains the existing compression settings (block 640). After blocks 635 and 640, method 600 returns to block 605.

Referring now to FIG. 7, one embodiment of a method 700 for selecting a MCS level based on a compression ratio is shown. A MAC layer unit (e.g., MAC layer unit 330 of FIG. 3) receives a chunk of compressed video data from a codec (e.g., video compression engine 310 of FIG. 3) (block 705). The MAC layer unit retrieves an indication of the compression ratio from a header of the chunk of compressed video data (block 710). If the compression ratio is greater than a threshold (conditional block 715, "yes" leg), then the MAC layer unit utilizes a first MCS level for modulating the compressed video data (block 720). Otherwise, if the compression ratio is less than or equal to the threshold (conditional block 715, "no" leg), then the MAC layer unit utilizes a second MCS level for modulating the compressed video data, wherein the second MCS level is higher than the first MCS level (block 725). After blocks 720 and 725, method 700 ends. It is noted that in other embodiments, method 700 can be modified so that the MAC layer unit compares the compression ratio to any number of other thresholds and selects from more than two different MCS levels based on the comparisons.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a codec configured to store an indication of a compression ratio within a header in each chunk of compressed data; and
   a media access control (MAC) layer unit comprising circuitry configured to:
      retrieve the indication of the compression ratio from the header of each chunk of compressed data; and
      determine a modulation coding scheme (MCS) for modulating the compressed data on a wireless link based on the compression ratio.

2. The system as recited in claim 1, wherein the MAC layer unit is further configured to generate a request for the codec to change compression settings for compressing data.

3. The system as recited in claim 2, wherein the MAC layer unit is configured to:
   monitor a link quality of the wireless link; and
   send a request for the codec to change compression settings responsive to detecting a change in the link quality of the wireless link.

4. The system as recited in claim 3, wherein the MAC layer unit is configured to generate a request for the codec to increase the compression ratio responsive to detecting a deterioration in the link quality of the wireless link.

5. The system as recited in claim 3, wherein the codec is configured to compress one or more chunks of data using previous compression settings subsequent to receiving the request to change compression settings.

6. The system as recited in claim 1, wherein the MAC layer unit is configured to:
   modulate the chunk of compressed data with a first MCS level if the compression ratio is above a first threshold;
   modulate the chunk of compressed data with a second MCS level if the compression ratio is less than or equal to the first threshold, wherein the second MCS level is higher than the first MCS level.

7. The system as recited in claim 6, wherein the MAC layer unit is configured to compare the compression ratio to a plurality of thresholds.

8. A method comprising:
   storing an indication of a compression ratio within a header in each chunk of compressed data;
   conveying each chunk of compressed data to a media access control (MAC) layer unit;
   retrieving, by the MAC layer unit, the indication of the compression ratio from the header of each chunk of compressed data; and
   determining, by the MAC layer unit, a modulation coding scheme (MCS) for modulating the compressed data on a wireless link based on the compression ratio.

9. The method as recited in claim 8, further comprising generating, by the MAC layer unit, a request for the codec to change compression settings for compressing data.

10. The method as recited in claim 9, further comprising the MAC layer unit:
    monitoring a link quality of the wireless link; and
    sending a request for the codec to change compression settings to the codec responsive to detecting a change in the link quality of the wireless link.

11. The method as recited in claim 10, further comprising the MAC layer unit generating a request for the codec to increase the compression ratio responsive to detecting a deterioration in the link quality of the wireless link.

12. The method as recited in claim 10, further comprising the codec compressing one or more chunks of data using previous compression settings subsequent to receiving the request to change compression settings.

13. The method as recited in claim 8, further comprising the MAC layer unit:
    modulating the chunk of compressed data with a first MCS level if the compression ratio is above a first threshold;
    modulating the chunk of compressed data with a second MCS level if the compression ratio is less than or equal to the first threshold, wherein the second MCS level is higher than the first MCS level.

14. The method as recited in claim 13, further comprising the MAC layer unit comparing the compression ratio to a plurality of thresholds.

15. A transmitter comprising:
    a codec configured to:
       compress video data into a plurality of chunks of compressed data; and
       store an indication of a compression ratio within a header in each chunk of compressed data; and
    a media access control (MAC) layer unit comprising circuitry configured to:
       retrieve the indication of the compression ratio from the header of each chunk of compressed data; and
       determine a modulation coding scheme (MCS) for modulating the compressed data on a wireless link based on the compression ratio.

16. The transmitter as recited in claim 15, wherein the MAC layer unit is further configured to generate a request for the codec to change compression settings for compressing data.

17. The transmitter as recited in claim 16, wherein the MAC layer unit is configured to:
    monitor a link quality of the wireless link; and send a request for the codec to change compression settings to the codec responsive to detecting a change in the link quality of the wireless link.

18. The transmitter as recited in claim 17, wherein the MAC layer unit is configured to generate a request for the codec to increase the compression ratio responsive to detecting a deterioration in the link quality of the wireless link.

19. The transmitter as recited in claim 17, wherein the codec is configured to compress one or more chunks of data using previous compression settings subsequent to receiving the request to change compression settings.

20. The transmitter as recited in claim 15, wherein the MAC layer unit is configured to:
   monitor a plurality of parameters during a beamforming training procedure;
   modulate the chunk of compressed data with a first MCS level if the compression ratio is above a first threshold;
   modulate the chunk of compressed data with a second MCS level if the compression ratio is less than or equal to the first threshold, wherein the second MCS level is higher than the first MCS level.

* * * * *